J. K. DIAMOND.
COUPLING PIN FOR BELT LACINGS.
APPLICATION FILED MAY 10, 1916.

1,271,444.

Patented July 2, 1918.

Glue filler mixed with mica

Inventor
James K. Diamond
BY Moulton & Lunance
Attorneys.

UNITED STATES PATENT OFFICE.

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN.

COUPLING-PIN FOR BELT-LACINGS.

1,271,444.   Specification of Letters Patent.   Patented July 2, 1918.

Application filed May 10, 1916. Serial No. 96,657.

*To all whom it may concern:*

Be it known that I, JAMES K. DIAMOND, a citizen of the United States of America, residing at Grand Rapids, in the county of Kent and State of Michigan, have invented certain new and useful Improvements in Coupling-Pins for Belt-Lacings; and I do hereby declare the following to be a full, clear, and exact description of the invention, such as will enable others skilled in the art to which it appertains to make and use the same.

This invention relates to a belt pin of the kind used to connect metal staples or fasteners firmly secured to the ends of belts, the closed ends of the staples or fasteners passing by each other so that the belt pin may be entered therethrough. Various materials have heretofore been used for the pins such as; raw hide, bamboo and the like. The tension to which a belt is subjected transmitted by the belt staples or fasteners to the pin has a tendency to work injury to the pin it being cut and weakened where the belt staples or fasteners bear against the pin. This is especially true if proper lubrication is not maintained at all times between the belt pin and the staples or fasteners which bear thereagainst. It is an object and purpose of my invention to provide a new and improved belt pin in which a porous or permeable body is provided adapting it to receive and be impregnated with a glue or like binding and stiffening substance which carries with it in suspension any proper lubricant. A further object of my invention resides in provision of a very economically manufactured yet efficient belt pin of the character outlined and one in which, though the pin should wear where the belt staples bear against it, nevertheless presents at all times, wearing surfaces which will not cut under pressure of the fasteners or staples and one which is self lubricating. Other objects and purposes not specifically enumerated will appear as disclosure of the invention progresses, reference being had to the accompanying drawing, in which;

Like reference characters refer to like parts throughout the several views of the drawings.

Figure 1:
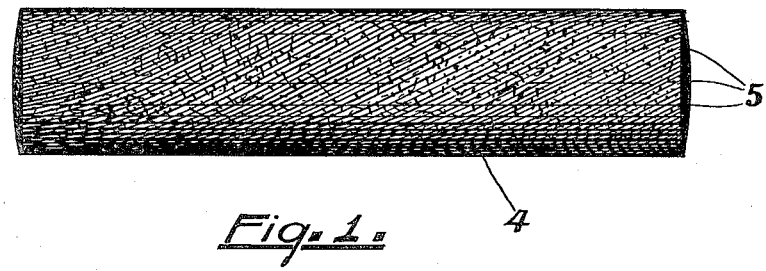
Figure 1 is an elevation, enlarged, of a belt pin made in accordance with my invention.
Figure 2:
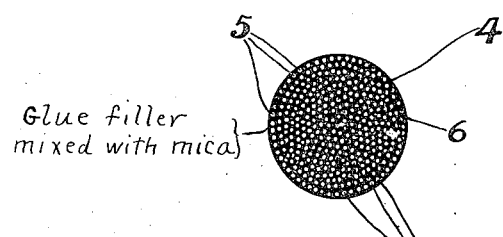
Fig. 2 is a transverse section therethrough.
Figure 3:
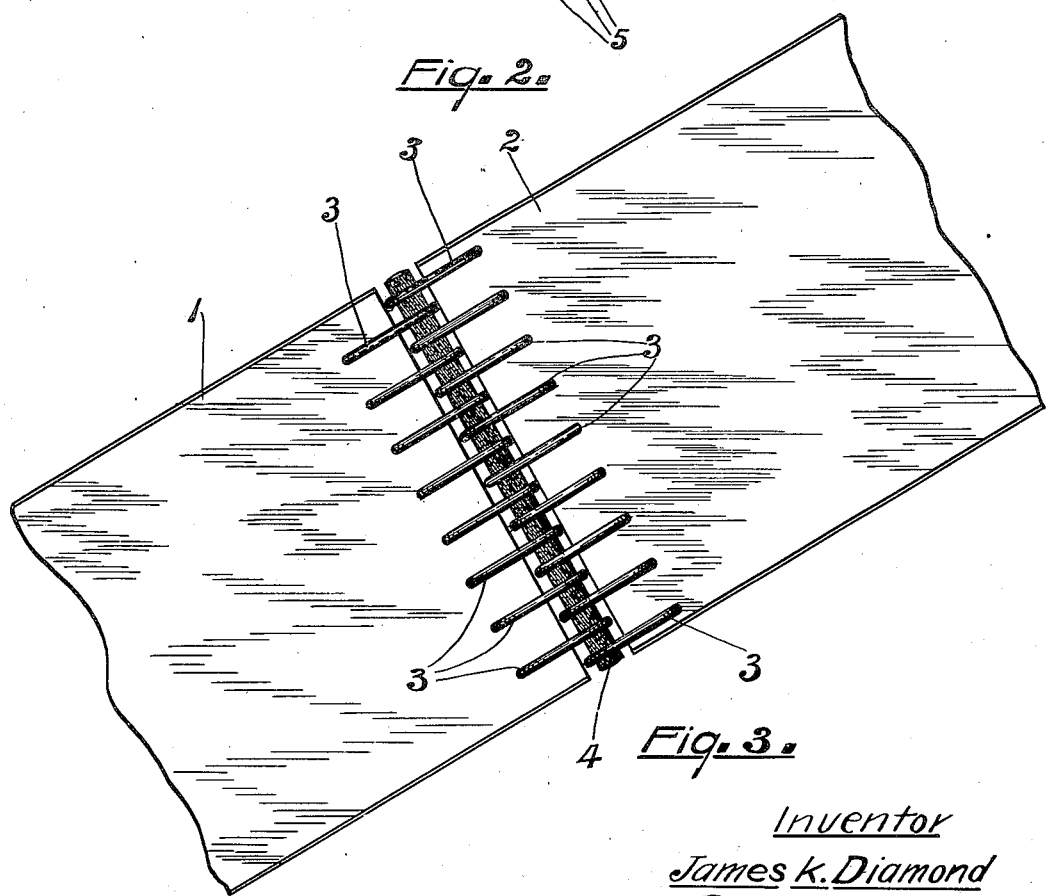
Fig. 3 is a perspective view illustrating the use of the pin in connection with belt fasteners for securing the ends of a belt together.

In the attachment of belt ends like those shown at 1 and 2, a plurality of belt staples or fasteners 3 are inserted in each belt end and permanently secured thereto. The middle bends of the staples project a distance beyond each belt end and are located so as to pass by one another or intermesh when the side edges of the two belt ends are in alinement. A belt pin such as indicated at 4 is inserted through all of the staples or fasteners as shown in Fig. 3 and serves to connect the ends of the belt together.

In my invention the pin 4 is formed from a large number of strands of fiber preferably spirally twisted together to form a cylindrical member which may be of any required or desired proportions. In practice I have found that the fiber of sisal hemp is to be preferred, it being preferably twisted as in a cord with the fibers 5 lying spirally thereof. This cord is impregnated with binding and stiffening material 6 which in practice is preferably of glue carrying in suspension any suitable dry lubricant such as mica or the like, it of course being apparent that any suitable equivalent binder carrying an equivalent lubricant may be used as well. This binder permeates and completely fills the spaces between the fibers 5 and attaches and stiffens the same so that the pin when made is thoroughly permeated with the binder and lubricant and will not cut or wear any more quickly at any point within the pin than on the outer surface thereof but will present a self lubricating bearing surface at all times against which the staples or fasteners engage.

I claim:

1. A coupling pin for belt lacings comprised of a plurality of fibrous strands spirally twisted lengthwise of the pin and a glue-like or adhesive binder permeating the body of the pin and filling the spaces between the strands and stiffening the same, substantially as described.

2. A coupling pin for belt lacings comprised of a plurality of fibrous strands twisted spirally of the pin and a glue-like binder carrying in suspension a lubricant permeating the entire body of the pin and filling the spaces between the strands, substantially as described.

3. A coupling pin for belt lacings comprised of a plurality of spirally twisted fibrous strands lying lengthwise of the body, a glue-like binder impregnating and stiffening said strands and located between the same and pulverized mica mixed throughout the binder and also on the surface of the pin.

In testimony whereof I affix my signature.

JAMES K. DIAMOND.